INVENTORS.
RAYMOND W. BUSH
FRANK E. HILLIKER
BY
ATTORNEYS

INVENTORS.
RAYMOND W. BUSH
FRANK E. HILLIKER
BY
ATTORNEYS

INVENTORS.
RAYMOND W. BUSH
BY FRANK E. HILLIKER
ATTORNEYS

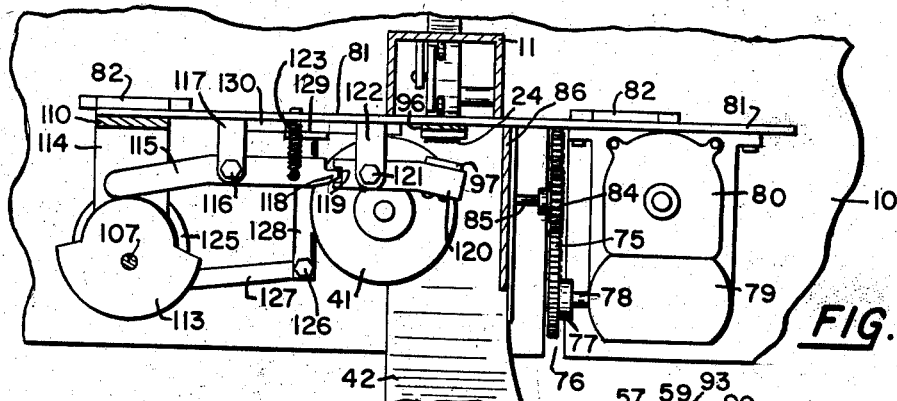
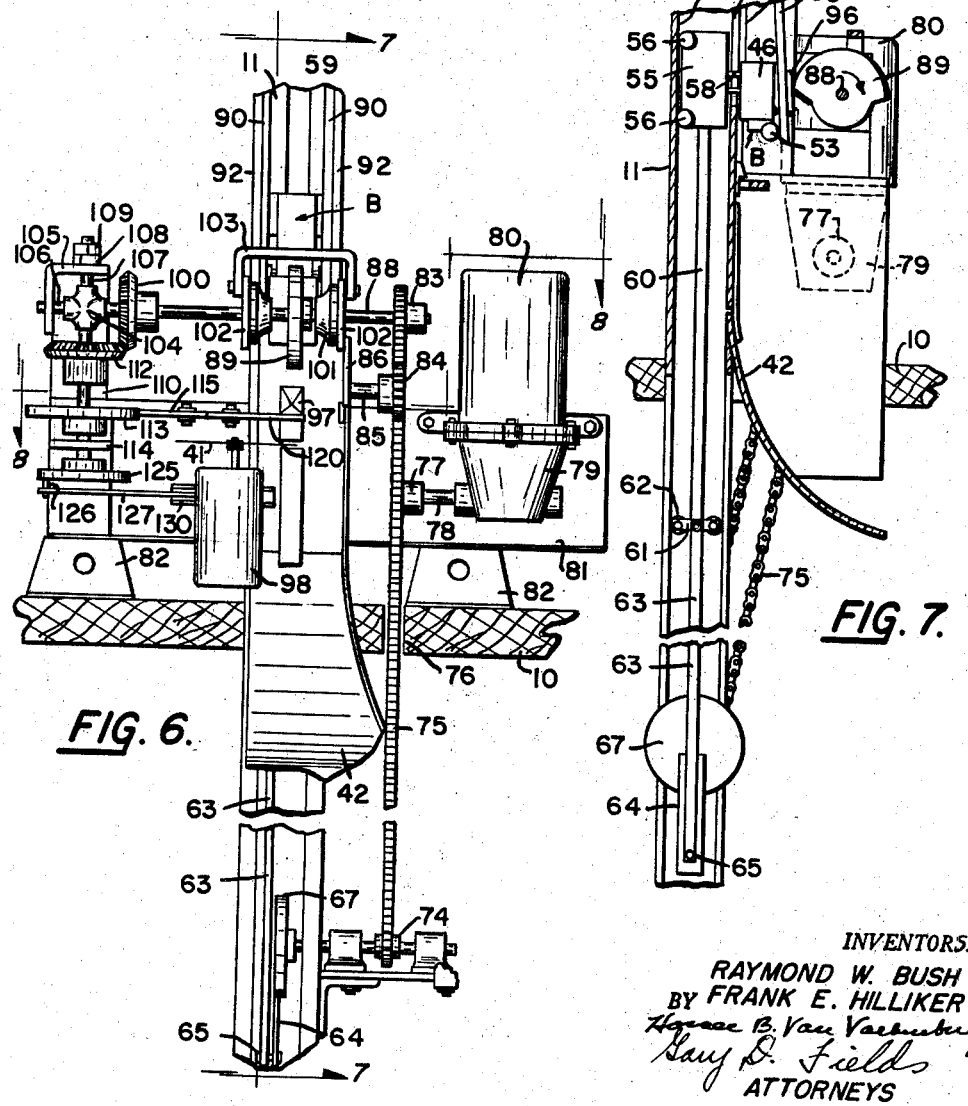

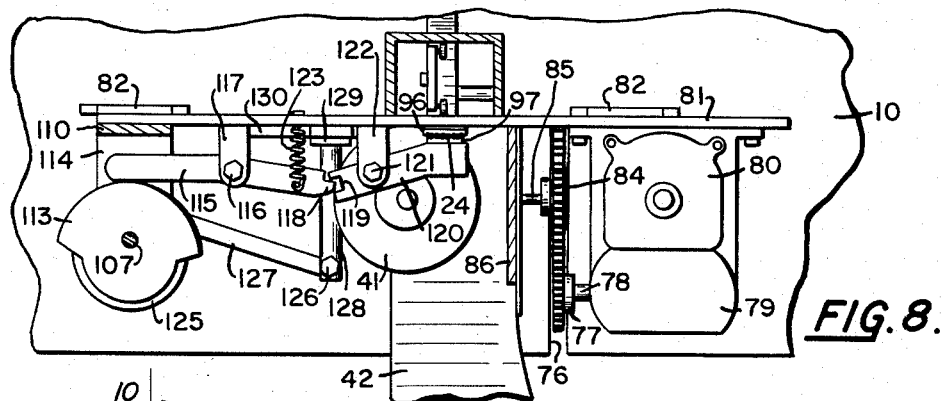
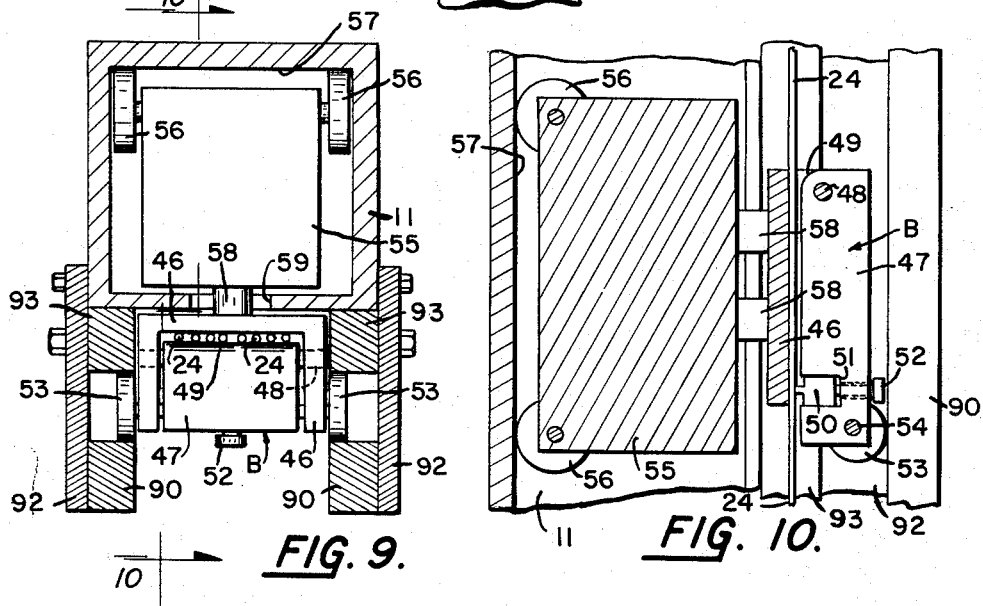
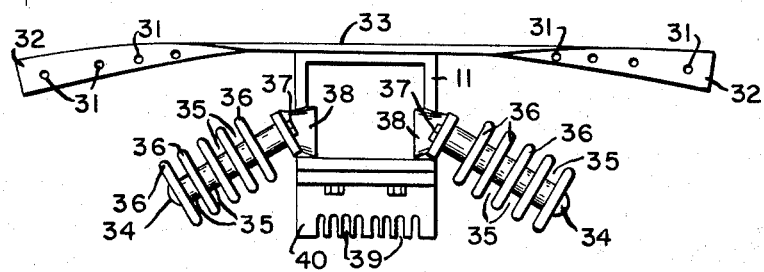

United States Patent Office 3,194,101
Patented July 13, 1965

3,194,101
STRING CUTTER HAVING RECIPROCATING GRIPPER MEANS TO FEED STRINGS TO THE CUTTER
Raymond W. Bush, 5595 N. Federal Blvd., Denver 21, Colo., and Frank E. Hilliker, 1170 Independence, Lakewood, Colo.
Filed Feb. 15, 1962, Ser. No. 173,589
4 Claims. (Cl. 83—277)

This invention relates to a machine for cutting strands into lengths, and more particularly for cutting lengths of string or the like.

In the manufacture of certain articles, particularly articles of clothing, tie strings or cords are often needed and the problem of cutting them at a sufficiently rapid pace has been acute. Generally, these tie strings are to be of uniform length and have tediously been cut by hand. Such a procedure is quite time consuming and may require the efforts of several persons in order to cut the strings at a rate which will keep up with the rate of production of the article being manufactured. Also, similar problems arise in making up harnesses for electrical panels wherein it is necessary to have a plurality of wires cut to the same length.

Among the objects of this invention are to provide a machine for cutting string or the like; to provide such a machine which will rapidly and quickly cut strings or the like into lengths; to provide such a machine which will cut a plurality of strings or the like into lengths simultaneously; to provide such a machine which dispenses a plurality of strings or the like from separate spools and cuts them to predetermined, uniform length; and to provide a machine for cutting string or the like which is effective and efficient in operation.

Additional objects and the novel features of this invention will become apparent from the description which follows, taken in conjunction with the accompanying drawings, in which:

FIG. 5 is an enlarged, offset horizontal section, taken along line 5—5 of FIG. 3, but with the strings in place, showing a string holding clamp in released position;

FIG. 6 is an enlarged, fragmentary, front elevation, similar to FIG. 3, but with the bobbin in a lower position;

FIG. 7 is a fragmentary vertical section, taken along line 7—7 of FIG. 6;

FIG. 8 is an enlarged, horizontal section, taken along line 8—8 of FIG. 6, but with the strings in place, showing a string holding clamp in clamping position;

FIG. 9 is an enlarged, horizontal section, taken along line 9—9 of FIG. 3, but with the strings in place, showing additional details of the bobbin;

FIG. 10 is a vertical offset section, taken along line 10—10 of FIG. 9; and

FIG. 11 is a greatly enlarged, fragmentary top plan view, taken from the position of line 10—10 of FIG. 1 and showing particularly the string guide means.

Figure 1:
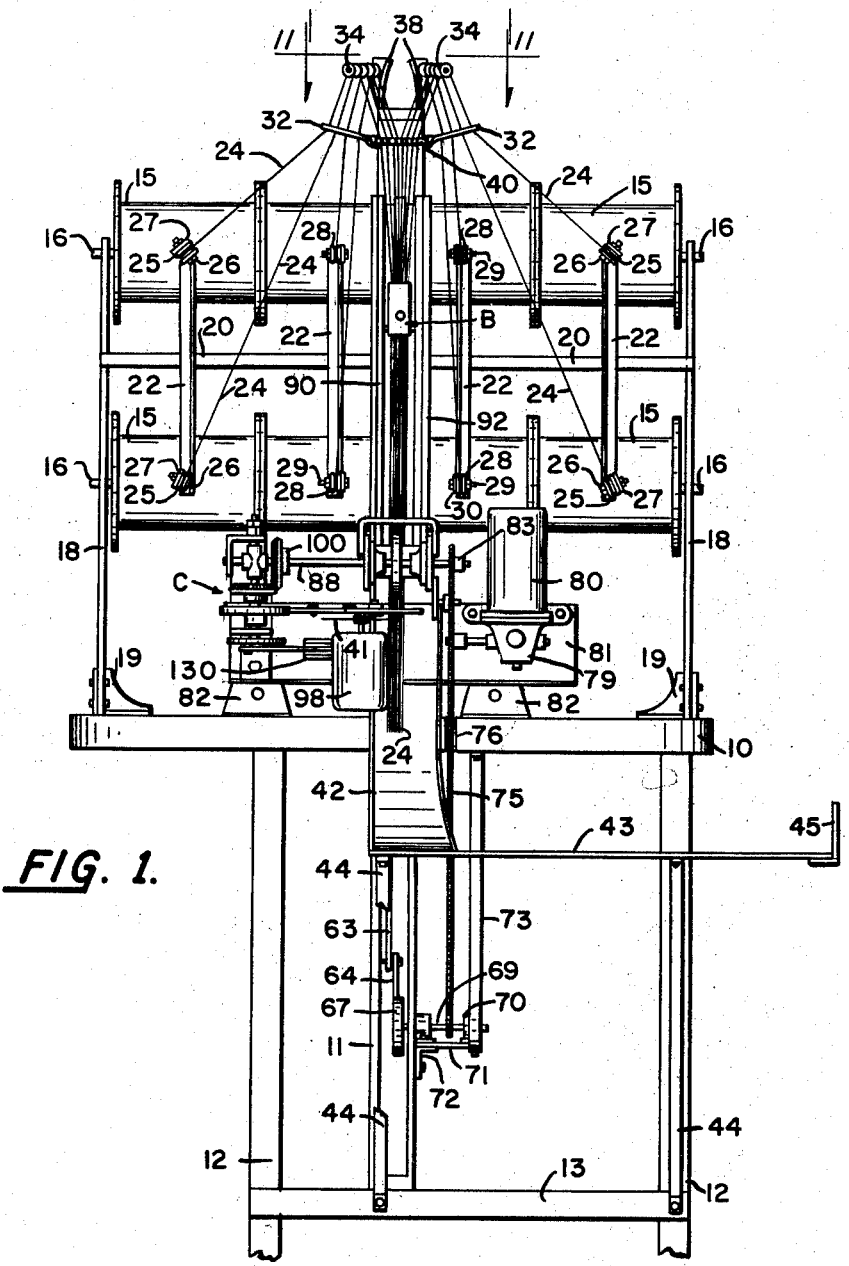
FIG. 1 is a front elevation of a string cutting machine of this invention.
Figure 2:
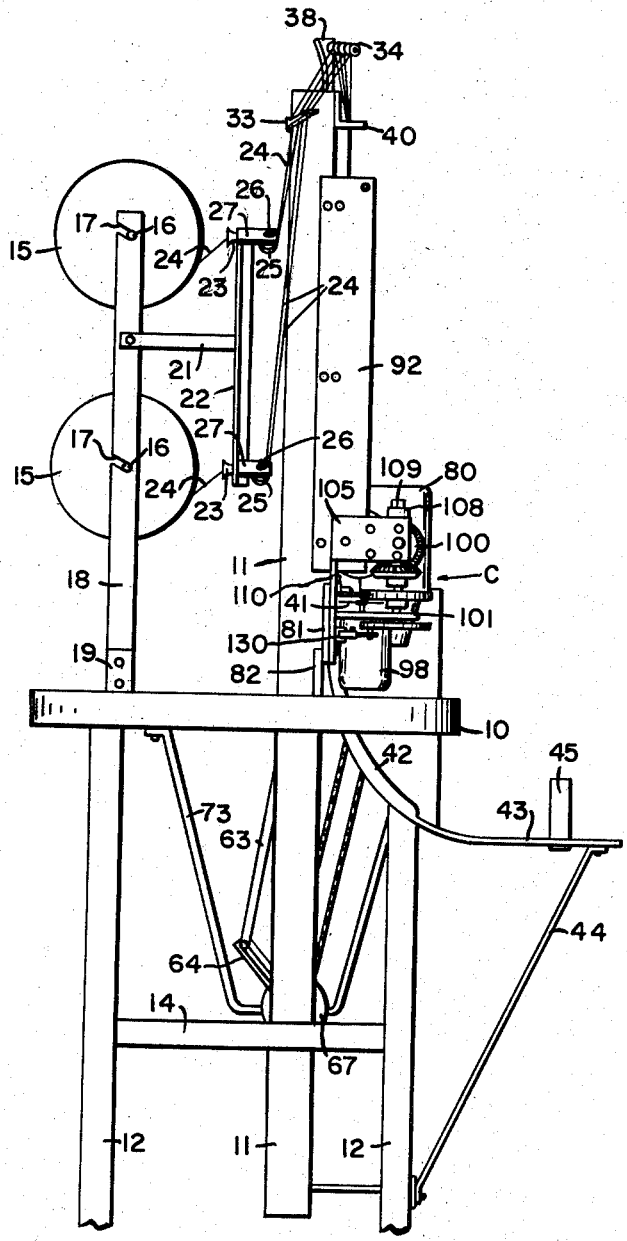
FIG. 2 is a side elevation of the string cutting machine of FIG. 1.

A machine for cutting strings or the like into lengths, constructed in accordance with this invention, includes a string cutter C of FIGS. 1 and 2, mounted on a table 10, which may be conveniently made of wood and through which extends a vertical metal mast 11, conveniently rectangular in cross section but at the front open or slotted at certain positions, as described later. The table 10 is supported by pairs of metal front and rear legs 12, the front legs being strengthened by a cross brace 13, which may be welded therebetween, and the front and rear legs being interconnected by a side brace 14, which may also be welded in place. A plurality of flanged spools 15, such as eight, on which the strings to be cut are wound, are supported on a pair of vertically spaced rods 16 which are supported in downwardly slanted notches 17, as in FIG. 2, of spaced vertical supports 18, which are conveniently attached to table 10, as by angle brackets 19. Of course, the number of spools and hence the number of strings to be cut at one time may be varied to suit a particular job, but it has been found that the use of eight spools and strings work quite satisfactorily. A transverse bar 20 having rearwardly extending sides 21 connected to supports 18, in a position intermediate rods 16, as shown in FIGS. 1 and 2, is provided with four laterally spaced, upright angles 22 attached thereto, as shown, which correspond in number and are located centrally of the four vertical spaced pairs of spools 15. A metal grommet 23, as in FIG. 2, may be welded to the upper and lower end of each rear flange of each angle 22, at an appropriate hole therein, to serve as a guide through which the corresponding string 24 moves. The strings from the outermost spools are guided around rollers 25 which are rotatably mounted on bolts 26 extending through plates 27, welded to angles 22 at an appropriate inclination. Similarly, the strings from the innermost spools are guided around rollers 28 which are rotatably mounted on bolts 29 extending through plates 30, each welded to the forwardly extending flange of an angle 22. From the rollers 25 and 28, the strings are fed through holes 31 in the ends 32 of a guide bar 33, as in FIGS. 1 and 11, guide bar 33 being conveniently formed from steel or aluminum which is welded to the back of mast 11, with the ends 32 each being twisted to a generally horizontal position but inclined upwardly and outwardly. Mast 11 receives a bobbin B, to be described later. From guide bar 33, strings 4 pass around an upper reversing guide 34, at each side, each string being disposed in a slot 35 between circular flanges 36, as in FIGS. 1 and 11. Conveniently, guides 34 may be made from lengths of round stock which are turned on a lathe to form grooves 35 and flanges 36. The guides are held in place by bolts 37 extending through vertical supports 38, which are mounted on opposite sides of mast 11 at the upper end thereof and are advantageously twisted adjacent their upper ends, as shown, so that guides 34 are disposed at an angle to guide bar 33, as in FIG. 11. Finally, the individual strings 24 move downwardly through slots 39 in the lower flange of an angle 40 which is attached to the front of mast 11, as by bolts as shown, and are thus guided in individual, spaced relation to the bobbin B, as described below.

In general, the strings are moved downwardly by the bobbin B for a distance corresponding to the length of string to be cut, then clamped in stationary position, as described later, while being cut by transverse movement thereacross of a rotating cutting disc 41 of cutter C, bobbin B returning to an upper position while the strings are cut. When the lengths or segments of string are cut, they slide down a chute 42 and onto a ledge 43 extending to one side and supported by a pair of spaced brackets 44, which extend from the bottom of ledge 43 to cross brace 13. Conveniently, a stop 45 is provided at the outer end of ledge 43 to prevent the cut strings from falling off the ledge. The strings may then be placed in cartons or transferred directly to an assembly line.

Bobbin B, as in FIGS. 9 and 10, is provided with a channel shaped block 46 along which strings 24 extend and a clamping block 47 pivotally mounted on a pin 48, which extends between the flanges of channel block 46. The inner upper end of block 47 has a curved surface 49, so that it will not engage or bind strings 24 during its pivotal movement. A string clamping bar 50 is mounted in a transverse recess 51 in block 47 and may be adjusted inwardly or outwardly by an adjustment knob 52, which is threaded through clamping bar 47, as shown. A pair of rollers 53, one at each side, are rotatably mounted on a pin 54 at the lower end of block 47, as shown in FIGS. 9 and 10, for a purpose to be described. Clamping block 47 and channel 46 are mounted on a sliding block 55 which is disposed within mast 11 and is provided with vertically spaced rollers 56 which engage the rear inside wall 57 of the mast to facilitate movement of the block within the mast. Channel 46 is connected with sliding block 55 by a pair of vertically spaced pins 58 which extend through a front slot 59 in the mast. As in FIGS. 4 and 7, the upper end of an operating rod 60 is connected to the bottom of sliding block 55 and the lower end is connected to a bracket 61, which is provided with a pair of rollers 62 for guiding the bracket within the mast. As in FIGS. 3 and 4, the upper end of a link 63 is pivotally connected to bracket 61, while the lower end thereof is pivotally connected to a bell crank 64, as by a bolt 65 which is adjustable along a slot 66, to vary the length of the stroke of bobbin B, as will be apparent. Bell crank 64 is mounted in a slot in a disc 67, so that it does not extend laterally beyond the surface of the disc, as in FIGS. 3 and 6, to reduce the width of the crank and link assembly which move through a slot 68 in the front and rear of mast 11 during rotation of disc 67 and crank 64 and reciprocation of link 63. Thus, the block 55 and with it the bobbin B, are moved upwardly and downwardly by rotation of bell crank 64 and disc 67, the latter being mounted for rotation on a shaft 69 of FIGS. 1, 3 and 7, which is mounted in a pair of spaced pillow block bearings 70. Conveniently, bearings 70 are mounted on a base plate 71, which is supported by an angle 72 attached to the side of mast 11 and by a generally U-shaped bracket strap 73, which, as in FIGS. 2 and 3, extends under the outer end of plate 71 and is attached to the bottom of table 10. A sprocket 74 is mounted on shaft 69 between pillow blocks 70 and engages a chain 75 which moves within a slot 76 in table 10, as in FIG. 6. Chain 75 is driven by a sprocket 77 mounted on a shaft 78, in turn driven from an enclosed speed reduction unit 79, which is conveniently attached to the lower end of and driven by a motor 80. Motor 80 is mounted on the upright leg of a bracket 81, which is attached to the front of mast 11 and further supported on table 10 by a pair of spaced legs 82. The upper end of chain 75 extends around a sprocket 83 for moving the cutter and operating the bobbin, as described below. An idler sprocket 84, mounted on a stub shaft 85 which is journaled in a plate 86 attached to the corresponding side of mast 11, is positioned directly above sprocket 77, so that the front side of chain 75 positively engages drive sprocket 77.

Figure 3:
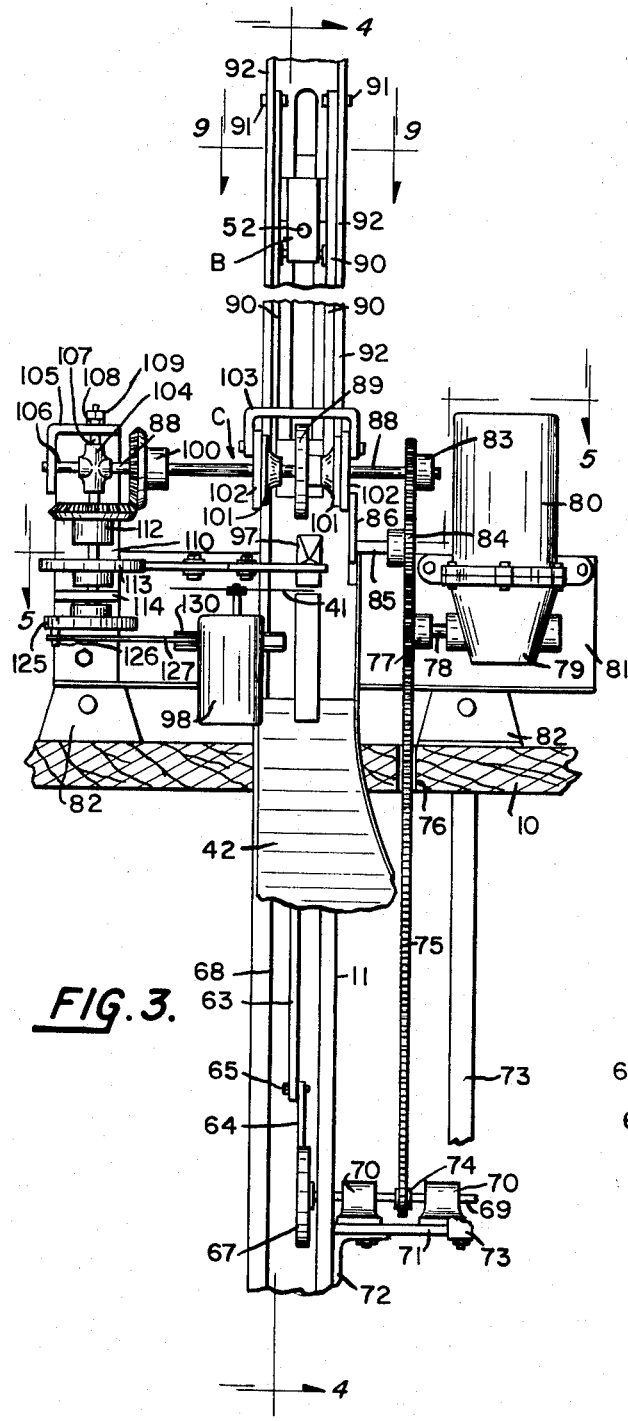
FIG. 3 is an enlarged, fragmentary front elevation of the string cutting machine, with the strings omitted for clarity of illustration.
Figure 4:
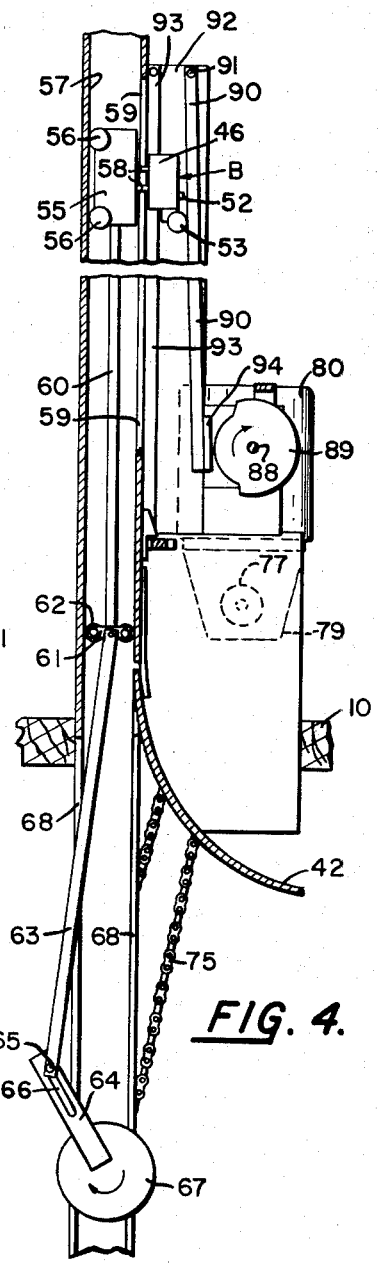
FIG. 4 is a vertical section, taken along line 4—4 of FIG. 3, showing particularly details of a bobbin mechanism.

Sprocket 83 drives a shaft 88 on which a cam 89, as in FIGS. 3 and 4, is mounted to cause bobbin B to clamp strings 24 during the downward stroke but release the strings during the upward stroke of the bobbin. For this purpose, a pair of generally vertical cam bars 90 are pivotally connected at their upper ends to pins 91 extending through side plates 92, as in FIG. 3, which are attached to and extend forwardly from the sides of mast 11. Conveniently, side plates 92 are attached to mast 34 by bolts, as shown in FIGS. 2 and 9, while a pair of spaced tracks 93 are attached to side plates 92 adjacent mast 11, as by bolts as shown, and along which rolls 53 ride. Advantageously, the lower ends of cam bars 90 are joined by a cross bar 94 which is engageable by cam 89, as in FIG. 4. When cross bar 94 is urged inwardly by cam 89, cam bars 90 will force rollers 53 against tracks 93, so that clamping bar 50 of bobbin B will engage strings 24 to clamp them against channel 46, as in FIG. 10. Cam 89 is so positioned and proportioned that cam bars 90 will be urged inwardly by cam 89 when bobbin B is on its downward stroke, thereby causing the strings to be pulled downwardly with the bobbin. When the lower end of the stroke is reached, cam 89 will be in the position shown in FIG. 7, so that as soon as cam 89 rotates further in the direction of the arrow, the cam bars 90 will be released, allowing clamping block 47 to pivot slightly in a counterclockwise direction, thereby releasing strings 24 as the bobbin starts its upward movement, so that the strings will slide freely between channel 46 and clamping bar 50.

Advantageously, after the strings have been pulled downwardly by the bobbin, the strings are held in stationary position between a fixed clamping plate 96 and a movable clamp 97, as in FIG. 8, when the bobbin begins its upward stroke. Fixed clamping plate 96 is attached to bracket 81, while movable clamp 97 is actuated in a manner described below. Then cutting disc 41, driven by a motor 98, is moved across the strings, cutting them into lengths. For the latter purpose, as in FIGS. 3 and 6, shaft 88 extends to a bevel gear 100 and is mounted in bearings 101, in turn mounted on plates 102 which are attached to side plates 92. Plates 102 are prevented from spreading apart by a yoke 103 which extends across the top of the plates and is bolted to the outsides thereof. The end of shaft 88 is journaled in a cross 104 which is mounted in an angle 105 by a pin 106 and a shaft 107, the latter being suspended by a bearing 108 and nut 109, as in FIGS. 2 and 6. Angle 105 is mounted on a vertical plate 110 attached to bracket 81, as in FIGS. 2 and 3, while a bevel gear 112 is mounted on shaft 107 below cross 104, for engagement with bevel gear 100. Conveniently, a cam 113 is mounted on shaft 107 below bevel gear 112, for controlling the operation of clamp 97, while the lower portion of shaft 107 is journaled in the horizontal leg of an angular plate 114 attached, as by welding, to bracket 81.

As in FIGS. 5 and 8, for operating clamp 97, an arm 115 is pivoted intermediate its ends on a pin 116 extending through a bracket 117, attached to bracket 81. One end of arm 115 is adapted to engage cam 113, while the other end is provided with a lip 118 received in a notch 119 in an arm 120 on the opposite end of which is mounted clamp 97. Arm 120 is pivotally mounted, intermediate its ends, on a pin 121 extending through a bracket 122 attached to bracket 81. Arm 115 is normally urged against cam 113 by a tension spring 123 having one end connected to arm 115, between pin 116 and lip 118, and the other end connected to bracket 81. Thus, clamp 97 will normally be urged away from strings 24. However, when cam 113 is turned to the position of FIG. 8, arm 115 is pivoted in a clockwise direction about pin 116, causing arm 120 to pivot in a counterclockwise direction, so that clamp 97 holds strings 24 against fixed clamping plate 96. It will be noted, from FIGS. 5 and 8, that cam 113 will hold clamp 97 against the strings during approximately one half of its rotation and will allow the clamp to move away from the strings during the other half of its rotation, as in FIG. 5. Thus, the strings will be gripped and held taut during the upward movement of bobbin B, but will be released during the downward movement of the bobbin, so that additional lengths of string may be positioned for cutting into the desired lengths.

For moving cutting disc 41 across the strings, while held by clamp 97, a crank disc 125 is attached to the lower end of vertical shaft 107 and is provided with a depending crank pin 126 near the outer periphery thereof. A link 127 is pivoted at one end on pin 126 and the other end is pivotally attached to the outer end of an arm 128, on which motor 98 is mounted, while the inner end of arm 128 is provided with a slide 129 which is received in a channel shaped guide 130, mounted on bracket 81, and is adapted to move back and forth therealong. Crank disc 125 is so oriented with respect to cam 113 that cutting disc 41 will move across the strings when clamp 97 is in engagement with the strings, but will move away from the strings when clamp 97 is released, i.e., during the downward stroke of bobbin B. The path of movement of cutting disc 41 is just below the lower end of clamp 97, so that the strings are held immediately above the point of severance.

The sequence of operations of the string cutting machine is as follows: When the bobbin B reaches the top of its stroke, cam 89 will engage cross bar 94, urging cam bars 90 inwardly to cause clamping bar 50 of the bobbin to grip strings 24 against channel 46. At this point, bell crank 64 will have moved past its uppermost vertical position, thereby causing the bobbin to start its downward movement and to pull the strings which are gripped therein downwardly with it. Just before the bobbin reaches its lowermost position, shown in FIG. 7, cutter C will begin to move inwardly toward the strings, through link 127. However, before the cutter reaches the strings, the bobbin will have reached its lowermost position, at which point cam 113 will cause arm 115 to pivot in a clockwise direction, forcing clamp 97 against the strings to prevent further movement thereof. Cam 89 then releases cam bars 90, allowing clamping bar 50 to be released as the bobbin starts its upward movement. As the bobbin moves upwardly, cutting disc 41 will cut across the strings, allowing the lengths below the cutting disc to slide down chute 42. The cutter C will then start moving outwardly again as crank disc 125 continues its rotation. As bobbin B reaches its uppermost position, cam 113 will allow arm 115 to pivot in a counterclockwise direction, under the influence of spring 123, to release clamp 97 so that the strings may again be pulled downwardly by bobbin B, as it begins another cycle.

From the foregoing, it will be apparent that a string cutting machine constructed in accordance with this invention fulfills to a marked degree the requirements and objects hereinbefore set forth. A machine has been provided which operates rapidly and can cut a plurality of lengths or segments of string or the like during each operation. Furthermore, the strings may be cut to predetermined lengths and the length of the string may be varied to suit the use to which they are to be put, merely by adjusting the stroke of the bobbin. In addition, it will be apparent that the machine may be used for cutting various linear products, such strings, ribbons, wires, shoelaces and the like.

Although a preferred embodiment of this invention has been illustrated and described, it will be understood that other embodiments may exist and that various changes and variations may be made without departing from the spirit and scope of this invention.

What is claimed is:

1. A machine for dispensing and cutting string and the like, including supply means from which said string is dispensed; a support mounted adjacent said supply means; a bobbin mounted for reciprocal movement along said support; pressure means adapted to engage said bobbin during movement along said support in one direction only, so that said bobbin grips said string to move said string in increments; reciprocating cutter means adapted to move across said string to cut said string into lengths; drive means operatively connected to said bobbin, said pressure means, said clamping means and said cutter means for operating them in synchronism, to dispense string in increments and cut said string into segments correspoding to said increments; fixed clamping means adjacent the path of movement of said cutter; a movable clamp adapted to hold said string against said clamping means; a rotatable shaft; a cam mounted on said shaft for rotation therewith; a lever pivoted intermediate its ends; resilient means connected adjacent one end of said lever to urge the other end of said lever into engagement with said cam; a lip on said one end of said lever; and an arm pivoted intermediate its ends, said clamp being mounted on one end of said arm and the other end having a notch engaged by said lip, so that said clamp may be moved out of engagement with said string and said lever moved off said cam.

2. A machine for dispensing and cutting string and the like, including supply means from which said string is dispensed; a support mounted adjacent said supply means; a channel mounted for reciprocal movement along said support and along which said string is directed; a clamping block pivotally mounted within said channel and having means adapted to clamp said string against said channel; rollers mounted ajacent said clamping means; laterally spaced cam bars pivoted adjacent one end of said support; means adapted to pivot said cam bars inwardly to engage said rollers to cause said clamping block to clamp said string against said channel during movement in one direction only to move said string in increments; reciprocating cutter means adapted to move across said string to cut said string into lengths; holding means adapted to clamp said string as said increments are dispensed and allow said cutter means to cut said lengths; and drive means operatively connected to said channel, said cam bars, said holding means and said cutter means for operating them in synchronism, to dispense said string in increments and to cut said string into segments corresponding to said increments.

3. A machine as set forth in claim 2, including a string clamping bar adjustably mounted within said clamping block; and adjustment means for moving said clamping bar relative to said clamping block.

4. A machine as set forth in claim 3, including a pair of side plates mounted on and extending longitudinally along said support, said cam bars being pivoted at one end on said side plates; a cross bar joining the opposite ends of said cam bars; and a rotatable cam operatively connected to said drive means and adapted to engage said cross bar during a portion of its revolution to pivot said clamping bars against said bobbin rollers, so that said clamping bar clamps said string against said channel.

References Cited by the Examiner
UNITED STATES PATENTS

| | | | |
|---|---|---|---|
| 639,272 | 12/99 | Newton | 83—282 |
| 847,536 | 3/07 | Zimmerman | 83—650 |
| 878,527 | 2/08 | Heil | 83—488 |
| 1,462,097 | 7/23 | Yamada | 83—650 |
| 1,655,471 | 1/28 | Marcell | 83—277 |
| 1,897,970 | 2/33 | Hofmann | 83—277 |
| 2,129,845 | 9/38 | King | 83—277 |
| 2,172,723 | 9/39 | Hoglund | 83—650 |
| 2,353,405 | 7/44 | King | 83—277 |
| 3,018,679 | 1/62 | Crowley | 83—277 |
| 3,044,336 | 7/62 | Bock | 83—488 |
| 3,048,199 | 8/62 | Barnes | 140—71 |

ANDREW R. JUHASZ, *Primary Examiner.*
CARL W. TOMLIN, *Examiner.*